United States Patent
Lin

(10) Patent No.: US 8,654,548 B2
(45) Date of Patent: Feb. 18, 2014

(54) FLYBACK PRIMARY SIDE OUTPUT VOLTAGE SENSING SYSTEM AND METHOD

(75) Inventor: Feng Lin, Camarillo, CA (US)

(73) Assignee: Semtech Corporation, Camarillo, CA (US)

(*) Notice: Subject to any disclaimer, the term of this patent is extended or adjusted under 35 U.S.C. 154(b) by 244 days.

(21) Appl. No.: 13/312,482

(22) Filed: Dec. 6, 2011

(65) Prior Publication Data

US 2012/0140531 A1    Jun. 7, 2012

Related U.S. Application Data

(60) Provisional application No. 61/419,950, filed on Dec. 6, 2010.

(51) Int. Cl.
*H02M 3/335* (2006.01)

(52) U.S. Cl.
USPC .................................. 363/21.18; 363/21.01

(58) Field of Classification Search
USPC ............... 363/20, 21.01, 21.12–21.18, 49, 97
See application file for complete search history.

(56) References Cited

U.S. PATENT DOCUMENTS

| | | | | |
|---|---|---|---|---|
| 4,812,769 A * | 3/1989 | Agoston | ........................ | 327/261 |
| 6,853,563 B1 * | 2/2005 | Yang et al. | ................. | 363/21.15 |
| 6,956,750 B1 * | 10/2005 | Eason et al. | ............... | 363/21.01 |
| 7,010,452 B2 * | 3/2006 | Gomes et al. | ................. | 702/117 |
| 7,352,595 B2 * | 4/2008 | Yang et al. | ................. | 363/21.13 |
| 7,463,497 B2 * | 12/2008 | Negrete | ...................... | 363/21.13 |
| 7,486,528 B2 * | 2/2009 | Yang | .......................... | 363/21.12 |
| 7,545,132 B2 * | 6/2009 | Borowy et al. | ............... | 323/285 |
| 8,285,502 B2 * | 10/2012 | Kenly et al. | ..................... | 702/64 |
| 2007/0070663 A1 * | 3/2007 | Adragna | ........................ | 363/89 |

* cited by examiner

*Primary Examiner* — Adolf Berhane
*Assistant Examiner* — Lakaisha Jackson
(74) *Attorney, Agent, or Firm* — O'Melveny & Myers LLP

(57) ABSTRACT

A method and apparatus of primary side output voltage sensing for a flyback power converter preserves secondary-side tranformer isolation without the use of opto-isolators and does not require multiple high-speed sample and hold circuits. A timing circuit measures the duration of the diode conduction interval during a first PWM control cycle and applies this measurement to set the voltage sampling time of the feedback loop during the next PWM cycle. The voltage sampling time for the next PWM cycle is configurable and may be set to occur near the middle of the diode conduction interval or near the end of the diode conduction interval. The cycle-to-cycle PWM duty cycle adjustment step size may be limited to ensure that the diode conduction interval does not vary substantially from cycle to cycle.

18 Claims, 5 Drawing Sheets

FLYBACK PRIMARY SIDE OUTPUT VOLTAGE SENSING SYSTEM AND METHOD

RELATED APPLICATIONS DATA

This application claims priority pursuant to 35 U.S.C. §119(e) to U.S. provisional patent application Ser. No. 61/419,950 filed Dec. 6, 2010, the subject matter of which is incorporated by reference herein in its entirety.

BACKGROUND OF THE INVENTION

1. Field of the Invention

The present invention relates to isolated flyback power converters, and more particularly, to flyback converters employing primary side output voltage sensing.

2. Description of Related Art

Flyback power converters are well known in the art and provide the advantage of transformer isolation between the input and output sections, which is desirable for many applications. For example, many noise-sensitive devices require power supplies that are isolated from noisy primary supplies such as those presented by car batteries, avionics intermediate power busses, or industrial power supplies, among others. A simplified block diagram of a flyback converter, typical of the prior art, is depicted in FIG. 1. Its basic operation is summarized as follows.

On the primary side, switch 116 is closed, causing current supplied by the primary supply 102 to begin to flow through the primary windings 104 of the transformer 120. The rising current through the primary windings induces a voltage across the secondary windings 106 of the transformer that is roughly equal to n times the supply voltage Vin, where n is the transformer turns ratio. The polarity of the induced voltage is arranged such that it reverse biases diode 108, which prevents current from flowing. At a later time, switch 116 is opened, shutting off the primary current. In order to sustain the magnetic flux within the transformer 120, a large voltage is induced in the secondary winding 106 that forward biases diode 108. The resulting current charges the buffer capacitor 112, which sources the output current at a certain voltage Vout 110 to drive the load. The primary-side switch 116 is alternatively opened and closed to keep the output buffer capacitor 112 charged to the desired target voltage Vout. The precise value of Vout depends on the switching duty cycle of the primary switch 116. Therefore, a control loop is typically formed by sensing the output voltage using a sense circuit 118 to provide feedback to a pulse width modulator 114 that varies the switch duty cycle to control the output voltage.

However, because the secondary output 110 is electrically isolated from the primary source 102 via transformer 120, the sense circuit 118 must maintain that isolation. Many prior art systems therefore employ optical isolators, which have the advantage of maintaining a high degree of isolation but also bring the disadvantages of complexity, increased parts count and cost, and component aging issues that degrade performance over time. As an alternative to optical isolation, some prior art systems use auxiliary transformer windings to monitor the output voltage. Again, this introduces additional complexity and increases the parts count.

Therefore, it is desirable to monitor the output voltage from the primary circuit side to avoid the complexities of placing a sensor on the other side of the isolation barrier. Monitoring the output voltage from the primary side, a technique known as "primary side sensing," has been discussed by some researchers in the field. For example, U.S. Pat. No. 7,463,497 to Negrete describes one method of primary side sensing.

In general, primary side sensing relies on the principle that the secondary output voltage Vout is reflected at the primary side. FIG. 2 illustrates a typical voltage waveform at the primary side switch 116 (see FIG. 1) of an operating flyback converter. Two cycles of the PWM waveform 202 are shown in FIG. 2. During the off cycle 212 of the primary side switch, the diode 108 remains in a conducting state during time interval 210 until the energy stored in the inductor has been delivered to the output. During the diode conduction interval, the voltage waveform 202 is equal to the sum of the input voltage Vin, indicated at 208, and n times the output voltage Vout, indicated at 206, plus the voltage dropped across the forward-biased diode 108, which decreases as the diode current drops until it shuts off, creating a knee 204 in the switch voltage waveform 202. Again, n refers to the transformer turns ratio. After the knee 204, the voltage waveform exhibits a damped oscillation until the primary switch 116 is switched on during the time interval indicated at 214. Therefore, by measuring the primary side voltage during the diode conduction interval 210, an indication of the output voltage Vout may be obtained.

The system discussed by Negrete in U.S. Pat. No. 7,463,497 uses a dual sample-and-hold circuit coupled to a control circuit such that each of the two sample and hold circuits capture alternating measurements of the PWM switch voltage during the diode conduction interval. The control circuit attempts to identify the first measurement taken that falls after the knee 204 and then backs up to the previous sampled value as an estimate of the output voltage. Such a system suffers from complexity in that two sample and hold circuits must operate at high speed to obtain multiple measurements of the switch voltage within the PWM cycle period, and the control circuit must be able to identify the knee in the voltage curve and be able properly select the correct sample instant for estimating the output voltage.

Accordingly, it would be useful to simplify the technique of obtaining an estimate of the output voltage to reduce reliance on multiple high-speed sample and hold circuits and to simplify the algorithm for identifying the knee 204 in the PWM voltage curve.

SUMMARY OF THE INVENTION

The invention is directed to primary side output voltage sensing systems for flyback power converters. However, the system and method are equally applicable to other switching power converter applications and circuit topologies as well as to motor control systems and other servo control systems and any other types of power systems that include switching control loops.

An embodiment of a primary side output voltage sensing system in accordance with the present invention includes a transformer with a primary and a secondary coil. The primary coil has two ports, the first port is connected to an input voltage. The second port is connected to a switching circuit, where opening and closing the switch selectively connects the second port of the primary coil to ground. The secondary coil is operatively connected to a diode, and the diode is operatively connected to and provides an output voltage to a load circuit. A Pulse Width Modulation (PWM) controller produces a periodic waveform for opening and closing the switching circuit during each cycle of the PWM waveform. A timing circuit including a counter receives a start signal when the PWM controller opens the switch during the Nth PWM cycle, where N is a positive integer. The counter continues to count until the counter receives a stop signal. The stop signal is generated when a sensing circuit operatively connected to the primary winding detects that a measured voltage indicative of the output voltage has crossed a threshold voltage. The counter value after receiving the stop signal represents a duration of time. Essentially, this time represents the interval within which the voltage should be sampled in order that it is indicative of the output voltage of the power converter. In this embodiment of the present invention, this time period substantially coincides with a diode conduction interval during which current is flowing through the diode. A strobe circuit is adapted to generate a voltage-sampling strobe during the (N+1)th cycle based at least in part on the value stored in the counter during the Nth cycle. A sample and hold circuit is operatively connected to the primary winding and the strobe circuit. The sample and hold circuit is configured to sample a voltage sample when triggered by the voltage-sampling strobe The feedback loop controlling the PWM circuit uses a sample of the input voltage acquired when the voltage-sampling strobe fires to control an output voltage of the flyback converter.

In one embodiment of a flyback converter in accordance with this invention, the sample and hold circuit is configured to sample only one value. By sampling only one value, the total number of parts included in this embodiment is kept low.

In one embodiment of a flyback converter in accordance with this invention, a filter circuit is included and connected between the sensing circuit and the timing circuit. This filter circuit is adapted to prevent multiple triggering of the counter caused by ringing on the counter inputs. In one embodiment of the filter circuit, a one-shot circuit performs this filtering function. It should be noted that any method of preventing multiple triggering of the counter inputs would fall within the scope of the invention, and a one-shot circuit is only an example.

In another embodiment of a flyback converter in accordance with the present invention, the voltage-sampling strobe occurs at a variable time during the (N+1)th PWM cycle.

In another embodiment of a flyback converter in accordance with the present invention, the variable voltage-sampling strobe is configured to occur during a time prior to the time indicated by the value stored in the counter during the Nth PWM cycle.

In another embodiment of a flyback converter in accordance with the present invention, the voltage-sampling strobe is configured to occur during the (N+1)th PWM cycle at approximately half of the time indicated by the value stored in the counter during the Nth PWM cycle. Placing the strobe in the middle of the interval increases the likelihood that the sample and hold circuit will sample the primary-side voltage during the time that the primary-side voltage is indicative of the output voltage.

In another embodiment of a flyback converter in accordance with the present invention, the magnitude of the variations in the duty cycle in the PWM waveform is limited to be less than a set maximum variation from one cycle to the next to reduce the possibility that the voltage-sampling strobe will occur at an undesirable time.

In another embodiment of a flyback converter in accordance with the present invention, the voltage-sampling strobe is configured to occur during the (N+1)th cycle at substantially the end of the diode conduction interval. By placing the voltage-sampling strobe substantially near the end of the diode conduction interval, the transients caused by the opening of the switch have a longer time to settle.

In another embodiment of the present invention, a method of primary-side output voltage sensing in a flyback power converter comprising a primary-side transformer coil, a switching circuit operatively connected to the primary-side transformer coil, a Pulse Width Modulation (PWM) circuit adapted to control an opening and closing of the switching circuit, a secondary-side transformer coil, a diode operatively connected between the secondary-side transformer coil and a load circuit, a timing circuit, and a sample and hold circuit operatively connected to the timing circuit and the PWM circuit, includes the step below. The method comprises sensing a voltage at a primary-side transformer coil while a switching circuit is in an off or open state. During this state, the input voltage is related to the output voltage but isolated from it due to the transformer. This voltage is monitored until it crosses a certain threshold value, and the time it takes to cross this threshold is recorded. This monitoring operation is implemented in a way that it substantially measures the time period during which the diode is conducting. After this time, the sensed voltage at the primary-side no longer reflects the output voltage provided to the load circuit. The counter starts counting when the PWM circuit causes the switching circuit to enter the off or open state, and the counter is stopped by the detection of the cutoff time. The value of the counter substantially indicates the length in time of an interval where the diode is conducting. A strobe signal is then generated to trigger a sample and hold circuit during the (N+1th) PWM cycle. The timing of this strobe is based at least in part on the value obtained by the counter during the Nth PWM cycle. The strobe signal then causes the sample and hold signal to capture a signal at the primary-side transformer coil. Because this sample and hold operation can be timed to occur during the diode conduction interval, this embodiment of the invention does not require obtaining multiple sample and hold circuit measurements at the primary-side during a single PWM cycle.

Another embodiment of a method for primary-side output voltage sensing for a flyback power converter further comprises the step of filtering inputs to the counter to prevent multiple triggering. This step can prevent erroneous measurements of the diode conduction interval.

Another embodiment of a method for primary-side output voltage sensing for a flyback power converter further comprises the step of compensating for a diode drop across the diode connected to the secondary transformer coil. This compensation step ensures that the PWM adjustments reflect a proper relationship between the primary-side voltage captured by the sample and hold circuit and the output voltage delivered to a load.

In another embodiment of a method for primary-side output voltage sensing for a flyback power converter, the sample and hold circuit only samples one voltage when triggered by the strobe circuit.

In another embodiment of a method for primary-side output voltage sensing for a flyback power converter, the strobe signal occurs at substantially half the time between when the PWM circuit causes the switching circuit to disconnect and the time indicated by the counter value obtained during the Nth cycle. This ensures that the PWM strobe occurs during the diode conduction interval by using a conservative timing for the strobe signal. This embodiment also improves simplicity of design by reducing the need for complex logic to determine strobe signal timing.

In another embodiment of a method for primary-side output voltage sensing for a flyback power converter, the strobe signal occurs substantially near the end of the diode conduction interval in the (N+1)th PWM cycle.

In another embodiment of a method for primary-side output voltage sensing for a flyback power converter, the duty cycle adjustment of the PWM waveform between the Nth PWM cycle period and the (N+1)th PWM cycle is limited to be less than a specified maximum duty cycle adjustment. By reducing the maximum duty cycle change between the Nth and (N+1)th PWM cycle, the value of the counter obtained during the Nth cycle is less likely to cause a sample and hold strobe to occur during the (N+1)th cycle while the diode is no longer conducting.

Although the present invention has been described in terms of an apparatus and a method for output voltage sensing of a flyback power converter, other embodiments and implementations are possible and would also fall within the scope and spirit of the present invention.

The invention is described in detail below with reference to the appended sheets of drawings which are first described briefly below.

DETAILED DESCRIPTION OF THE PREFERRED EMBODIMENT

An embodiment of the present invention includes an apparatus and method of achieving primary side sensing in the context of a flyback power converter. Specifically, a timing circuit is provided that allows the system to apply a measurement taken during one PWM cycle to set the instant of measurement of the PWM switch voltage during the following cycle, obviating the need for multiple high-accuracy and high-speed samples of the PWM waveform for control feedback.

Figure 1:
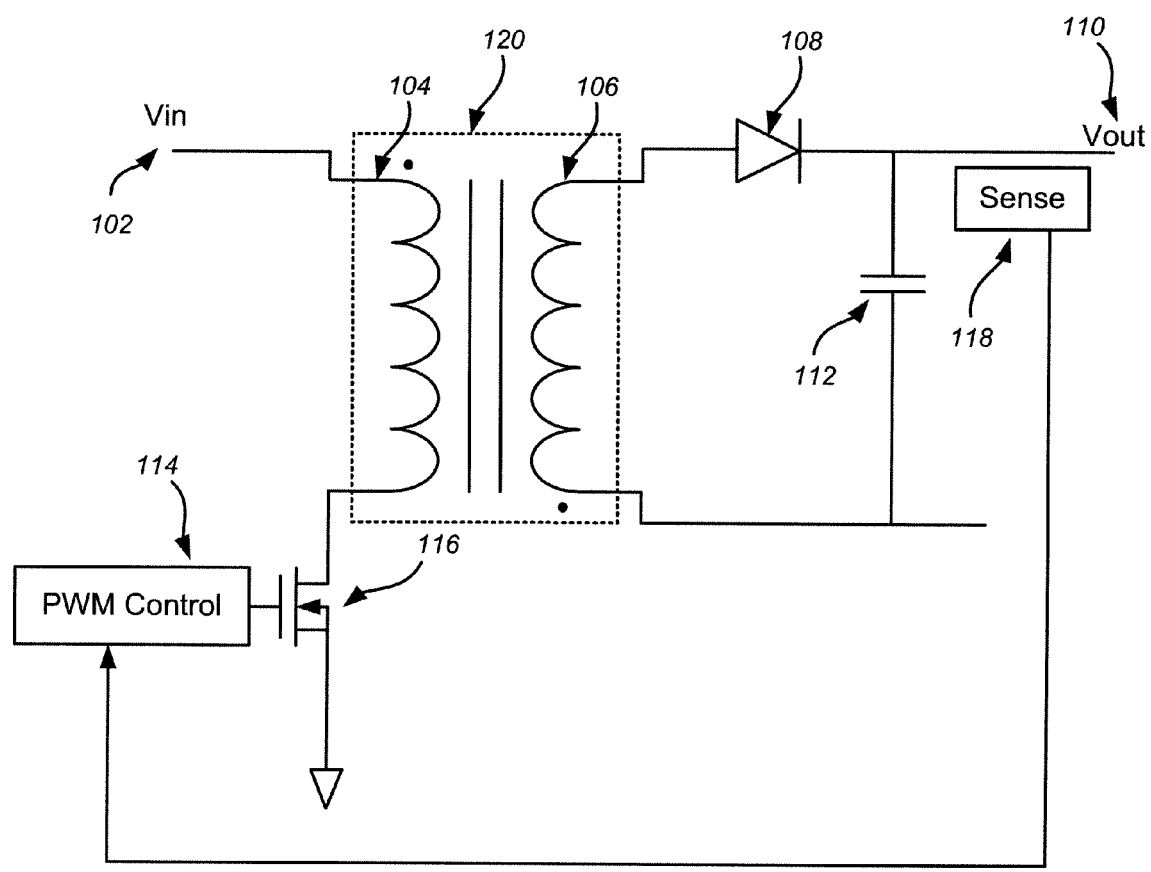
FIG. 1 depicts a simplified block diagram of a flyback converter typical of the prior art.
Figure 2:
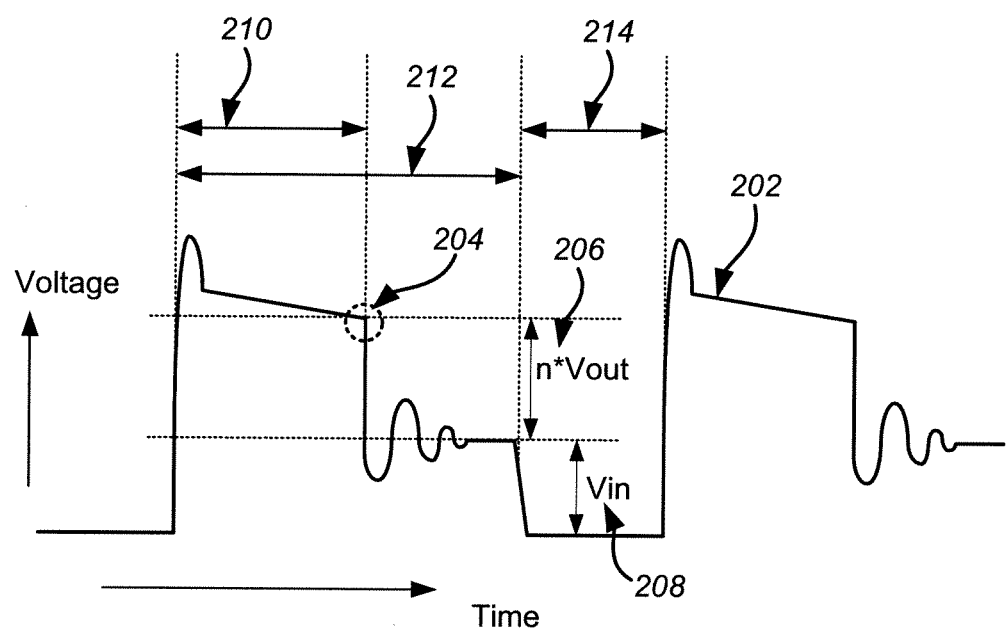
FIG. 2 depicts a typical voltage waveform measured at the primary PWM switch of a flyback converter.
Figure 3:
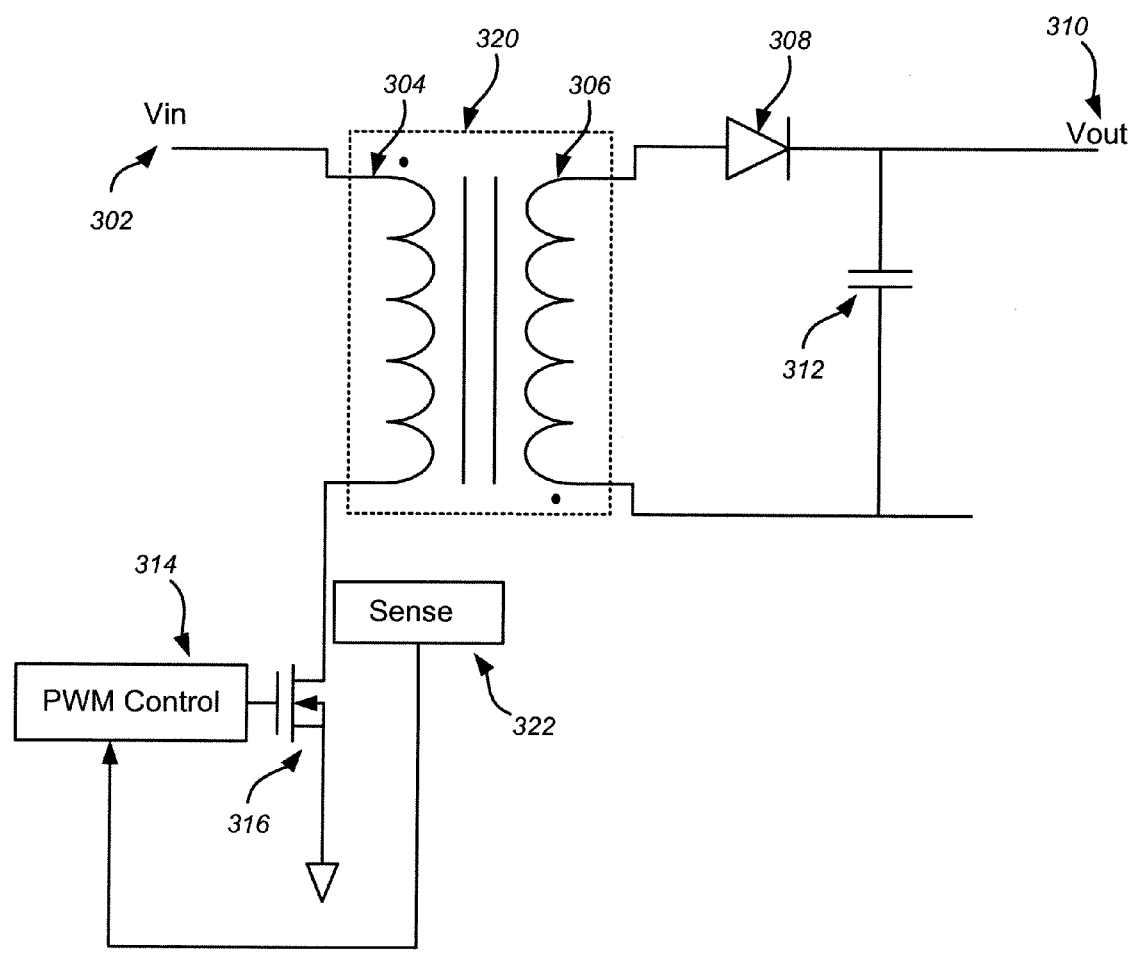
FIG. 3 is a simplified block diagram of an embodiment of a flyback converter in accordance with the present invention.

FIG. 3 depicts a simplified block diagram of a flyback converter in accordance with an embodiment of the present invention. The basic operation of the flyback converter depicted in FIG. 3 is similar to that of the circuit described above with reference to FIG. 1. The primary input voltage Vin 302 is isolated from the secondary output voltage 310 via transformer 320. The current through primary winding 304 is modulated by switch 316 under the control of PWM modulator 314. As described above, the voltage developed across the secondary winding 306 of the transformer 320 when the switch 316 is opened operates to forward bias diode 308 and charge the buffer capacitor 312. In contrast to the system shown in FIG. 1, however, the flyback converter of FIG. 3 uses a primary side sensor 322 to develop the control voltage that drives the PWM control circuit 314 rather than a secondary-side sensor. This eliminates the need for optical or transformer isolation of the sense circuit because it does not cross the primary-secondary isolation barrier.

Figure 4:
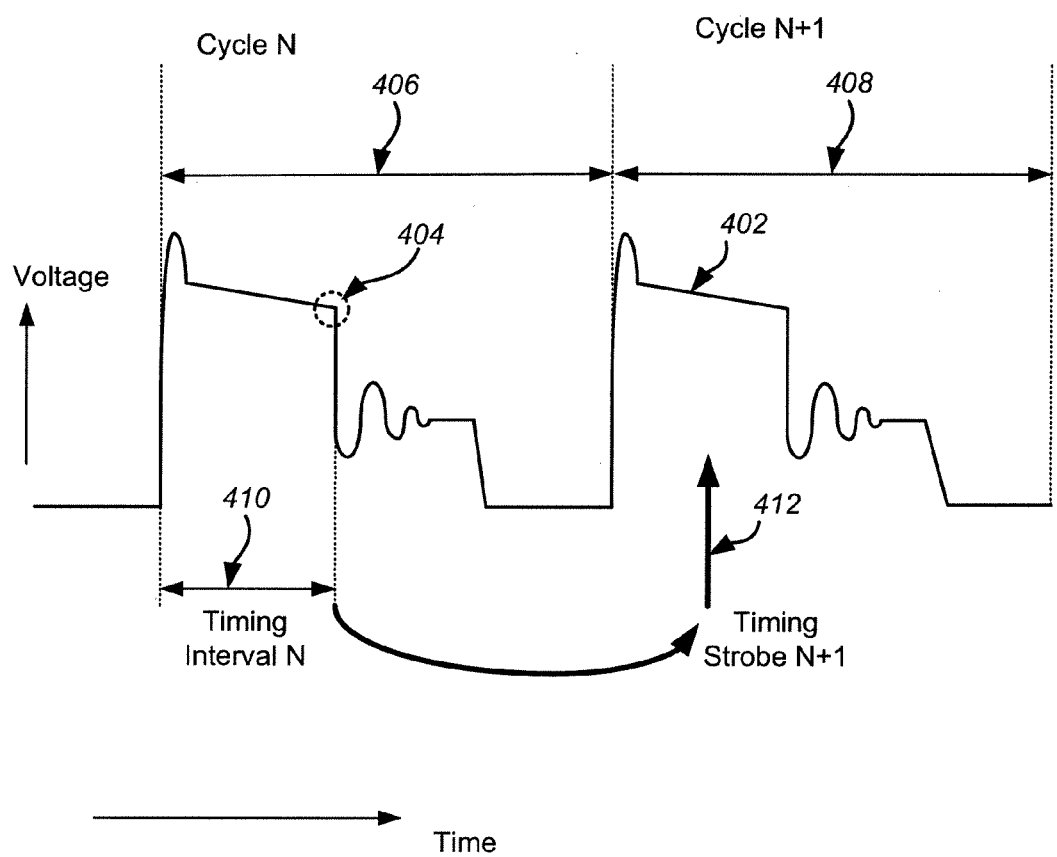
FIG. 4 depicts a voltage waveform and timing diagram associated with an embodiment of a flyback converter in accordance with the present invention.

In comparison with prior art systems employing primary side sensing, the sense circuit 322 and accompanying logic circuitry is greatly simplified because it is based on an N+1 cycle timer rather than on a precision voltage level search, as described in more detail below. As an illustration of this technique, FIG. 4 depicts a voltage waveform presented to the sense circuit 322 (see FIG. 3) and a timing diagram illustrating the N+1 cycle timer. In particular, two cycles of the voltage waveform at the PWM switch 316 are depicted as trace 402. During the Nth cycle 406, the diode conduction interval 410 is measured from the time the PWM switch is turned off until the diode turns off, as reflected by the knee 404 in the waveform 402. This measurement of the diode conduction interval 410 during cycle N is then used to set the timing of a sampling strobe 412 of a single sample and hold circuit (which can operate at a relatively slow rate) during cycle N+1 408. This simplified circuit obviates the need to continually and accurately track the waveform with high-speed sample and hold circuits to determine the position of the knee and then backtrack to the penultimate sample in order to extract information about the magnitude of the output voltage.

Figure 5:
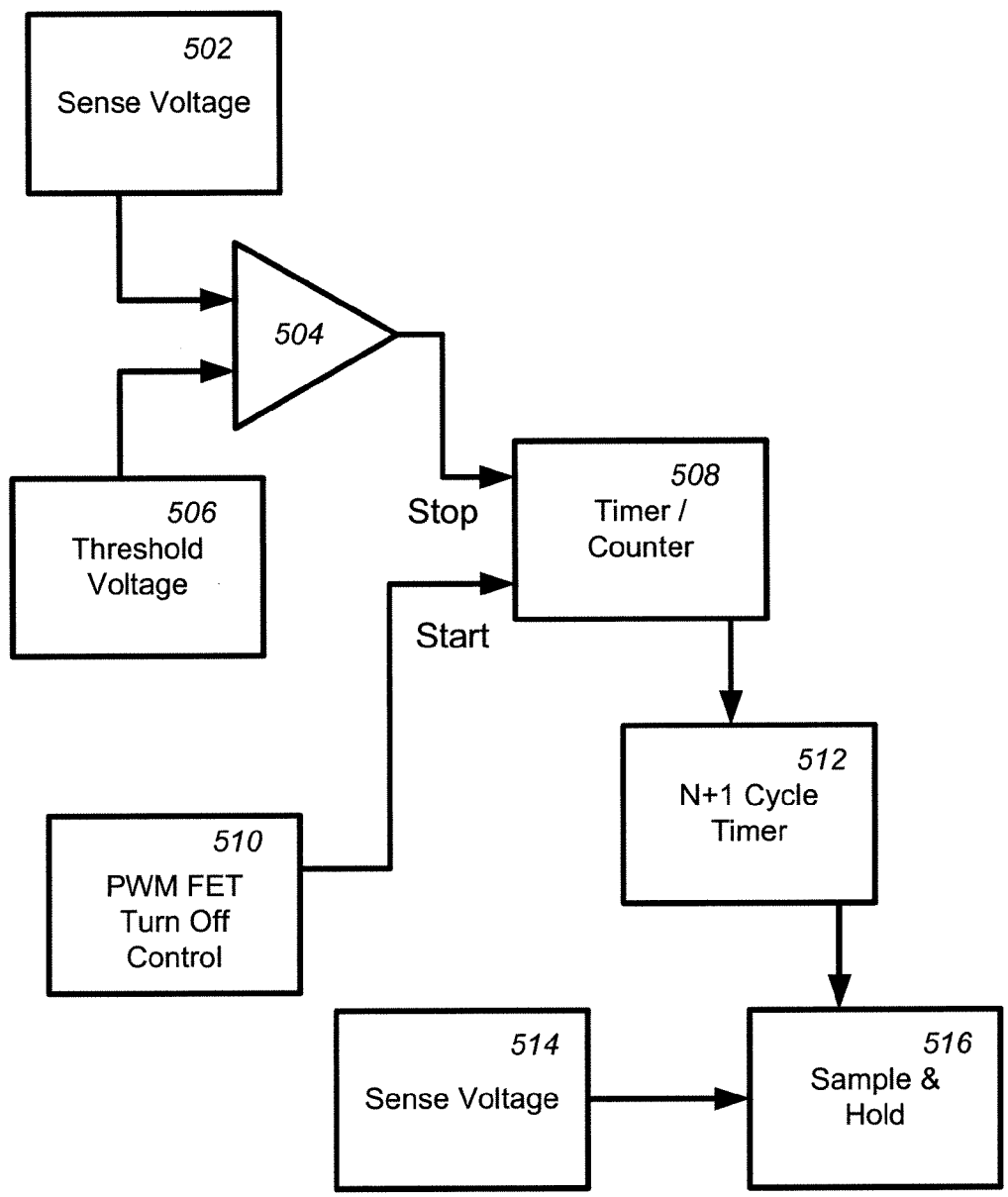
FIG. 5 presents a block diagram of an N+1 cycle timer in accordance with an embodiment of the present invention.

For one embodiment of a flyback converter in accordance with the present invention, the timing circuit used to measure the diode conduction interval is depicted schematically in FIG. 5. The timing circuit 508 may be implemented as a simple digital counter that is enabled when the PWM circuit 510 switches off the primary control FET. The counter 508 is then disabled by a simple comparator circuit 504 that compares the magnitude of the sense voltage 502 with a constant, tunable threshold voltage 506 that can be set for the nominal Vin and Vout control regime. In order to prevent multiple triggering of the timing circuit by the damped ringing of the PWM voltage after the diode turns off, techniques that are well known in the art, such as employing one-shot circuits, may be employed. The value of the counter 508, indicative of the diode conduction timing interval, can then be used to set the timing of the N+1 cycle timer 512, which controls when the primary sample and hold circuit 516 measures the sense voltage 514 during the subsequent PWM cycle.

The N+1 cycle timer 512 can be configured to place the timing strobe at any desired fraction of the measured diode conduction interval. In the example depicted in FIG. 4, the timing strobe 412 is set to occur in the middle of the diode conduction window. While the switch voltage in the middle of the diode conduction window will include a small contribution from the forward diode drop, this can easily be subtracted by an offset circuit prior to calculation of the Vout output voltage. Further, placing the strobe in the middle of the following cycle as opposed to the end of the following cycle avoids the possibility that it inadvertently falls beyond the edge of the diode conduction interval and results in instability of the control loop.

Because the PWM controller may adjust the cycle time from one cycle to the next, it is theoretically possible that the diode conduction interval in cycle N+1 could be significantly different from the one measured in cycle N. However, corrections to the duty cycle large enough to make a difference in this regard would be exceedingly rare once the PWM loop is locked. And in any case, in some embodiments of a flyback converter according to the present invention, the maximum duty cycle change can be limited and the strobe timing specifically selected to prevent the strobe from dropping into the valley following diode cutoff.

Although a particular embodiment of the cycle timer and strobe placement circuit was discussed with reference to FIG. 5, other embodiments and implementations are possible and would also fall within the scope and spirit of the present invention. Similarly, while the N+1 cycle timing technique was discussed herein with particular reference to the design of flyback power converters, this technique may also be useful to other systems that include switching control loops. For example, these techniques may be applied to other switching power converter applications and circuit topologies as well as to motor control systems and other servo control systems, among others, as would be readily recognized by one of ordinary skill in the art.

The invention further defined by the following claims.

What is claimed is:

1. A primary-side output voltage sensing apparatus for a flyback power converter comprising:
   a transformer comprising:
      a primary winding operatively connected to an input voltage, and
      a secondary winding operatively connected to a diode wherein the diode is operatively connected to a load circuit;
   a switching circuit operatively connected to the primary winding and configured to selectively connect an end of the primary winding to ground;
   a pulse width modulation (PWM) controller configured to produce a periodic PWM waveform for opening and closing the switching circuit during each cycle of the PWM waveform;
   a timing circuit including a counter and configured to:
      start the counter when the PWM controller opens the switching circuit during the Nth PWM cycle, wherein N is a positive integer; and
      stop the counter upon receiving a stop pulse;
      wherein a value stored in the counter represents a time duration of a diode conduction interval;
   a sensing circuit operatively connected to the primary winding and configured to generate the stop pulse by comparing a measurement of a voltage on the primary winding to a threshold voltage;
   a strobe circuit adapted to generate a voltage-sampling strobe during the (N+1)th PWM cycle based at least in part on the value stored in the counter;
   a sample and hold circuit operatively connected to the primary winding and the strobe circuit and configured to sample a voltage sample when triggered by the voltage-sampling strobe.

2. The apparatus of claim 1 wherein the sample and hold circuit is configured to sample only one value.

3. The apparatus of claim 1 wherein the strobe circuit comprises a strobe counter adapted to count down from a pre-set value to generate the voltage-sampling strobe during the (N+1)th cycle.

4. The apparatus of claim 3 wherein the filter circuit comprises a one-shot circuit.

5. The apparatus of claim 1 wherein a filter circuit is connected between the sensing circuit and the timing circuit and adapted to prevent multiple triggering of the timing circuit.

6. The apparatus of claim 1 further comprising:
   a compensation circuit adapted to compensate for a diode voltage drop across the diode connected to the secondary transformer coil; and
   a calculation circuit adapted to calculate a load voltage delivered to the load circuit.

7. The apparatus of claim 1 wherein the strobe circuit is adapted to produce the voltage-sampling strobe during a diode current conduction interval of the diode connected to the secondary transformer coil.

8. The apparatus of claim 1, wherein the strobe circuit is adapted to produce the voltage-sampling strobe at substantially a middle of the time duration of the diode conduction interval.

9. The apparatus of claim 1 wherein the strobe circuit is adapted to produce the voltage-sampling strobe at substantially the end of the diode conduction interval.

10. The apparatus of claim 1 wherein the PWM circuit is adapted to produce a duty cycle adjustment in a PWM waveform between the Nth PWM cycle and the (N+1)th PWM cycle wherein the duty cycle adjustment is less than a specified maximum duty cycle adjustment.

11. In a flyback power converter comprising a primary-side transformer coil, a switching circuit operatively connected to the primary-side transformer coil, a Pulse Width Modulation (PWM) circuit adapted to control an opening and closing of the switching circuit, a secondary-side transformer coil, a diode operatively connected between the secondary-side transformer coil and a load circuit, a timing circuit, and a sample and hold circuit operatively connected to the timing circuit and the PWM circuit, a method for primary-side output voltage sensing comprises the steps of:
   sensing a primary side signal at the primary-side transformer coil during an off state of the switching circuit connected to the primary-side;
   determining a cutoff time when the sensed signal at the primary-side crosses a threshold substantially indicating that the diode is no longer conducting;
   starting the timing circuit when the PWM circuit causes the switching circuit to disconnect;
   stopping the timing circuit at the cutoff time;
   producing a timing value indicative of a diode conduction interval during an Nth PWM cycle, where N is a positive integer;
   generating a strobe signal to trigger the sample and hold circuit during an (N+1)th cycle of the PWM circuit;
      wherein a timing of the strobe signal is based at least in part on the timing value obtained during the Nth cycle of the PWM circuit;
   sampling a signal at the primary side transformer coil during the (N+1)th cycle of the PWM circuit when the strobe signal is generated; and
   adjusting the PWM circuit based on the sampled signal to achieve a desired output voltage.

12. The method of claim 11, further comprising the step of filtering inputs to prevent multiple triggering of the timing circuit.

13. The method of claim 11, further comprising the step of compensating for a voltage drop across the diode connected to the secondary transformer coil.

14. The method of claim 11, wherein the sample and hold circuit only samples a single voltage for each strobe-signal trigger.

15. The method of claim 11, wherein the timing circuit generates the strobe signal such that the strobe signal occurs during the diode conduction interval during the (N+1)th cycle of the PWM circuit.

16. The method of claim 11, wherein the timing circuit generates the strobe signal during the (N+1)th cycle such that the strobe signal occurs substantially near the end of the diode conduction interval.

17. The method of claim 11, wherein the strobe signal during the (N+1)th cycle occurs at substantially halfway through the diode conduction interval.

18. The method of claim 11 wherein the duty cycle adjustment of the PWM waveform between the Nth PWM cycle period and the (N+1)th PWM cycle period is less than a specified maximum duty cycle adjustment.

* * * * *